United States Patent
Lee (10) Patent No.: US 6,357,267 B1
(45) Date of Patent: Mar. 19, 2002

(54) AUTOMOBILE GEAR SHIFTLEVER LOCK

(76) Inventor: Miko Lee, No. 5, Li Hsing Lane, Chung Cheng Rd., Hsin Chuang City, Taipei Hsien (TW)

( * ) Notice: Subject to any disclaimer, the term of this patent is extended or adjusted under 35 U.S.C. 154(b) by 0 days.

(21) Appl. No.: 09/467,506

(22) Filed: Dec. 20, 1999

(51) Int. Cl.⁷ .............................................. B60R 25/06
(52) U.S. Cl. ........................... 70/201; 70/195; 70/197; 70/247
(58) Field of Search ......................... 70/201, 195, 197, 70/247

(56) References Cited

U.S. PATENT DOCUMENTS

| | | | |
|---|---|---|---|
| 999,462 A | * 8/1911 | Miller | |
| 1,323,447 A | * 12/1919 | Brown | |
| 5,081,856 A | * 1/1992 | Hsu | 70/247 |
| 5,596,894 A | * 1/1997 | Lee | 70/201 |
| 5,775,141 A | * 7/1998 | Li | 70/237 |
| 6,098,431 A | * 8/2000 | Li | 70/195 |

* cited by examiner

*Primary Examiner*—Teri Pham Luu
(74) *Attorney, Agent, or Firm*—Heller Ehrman White & McAuliffe LLP (57) ABSTRACT

A gear shift lock for locking a gear shiftlever of an automobile with a manual transmission is disclosed. The lock has a ring with a through hole defined therethrough and a tube with a protrusion formed to be alternatively received in the through hole. When the protrusion is received in the through hole, the gear shiftlever is not able to be moved. When the protrusion of the tube is away from the through hole of the ring, the gear shiftlever is in an unlocked state and able to move freely.

2 Claims, 7 Drawing Sheets

AUTOMOBILE GEAR SHIFTLEVER LOCK

BACKGROUND OF THE INVENTION

1. Field of the Invention

The present invention relates to an automobile gear shiftlever lock, and more particularly to a gear shiftlever lock that can lock the gear shiftlever of an automobile with a manual transmission when the driver is away from the automobile, such that the automobile will not start unless the gear shiftlever is unlocked.

2. Description of Related Art

Automobile theft is quite serious in metropolitan areas. To prevent such a crime, various security means, such as alarms, steering locks, GPS tracking systems, fuel leaking devices, etc. have been introduced for users. All these devices or systems are quite useful in preventing or reducing the chances of a car from being stolen by a car theft. However, most of these devices or systems are quite delicate and expensive. Some of them even involve significant modifications to the interior of the automobile, such that not all the users can afford to have one mounted in the car. In order to provide an economic and effective lock to secure the gear shiftlever, a gear shiftlever lock is commercially promoted and is welcomed by the users. This gear shiftlever lock locks the gear shiftlever when the driver is away from the car, such that others will not be able make the car move even though the engine is "hot-wired" to start. This kind of gear shiftlever lock still suffers from drawbacks such as a complex structure and high manufacturing cost.

To overcome the shortcomings, the present invention tends to provide an improved gear shiftlever lock to mitigate and obviate the aforementioned problems.

SUMMARY OF THE INVENTION

The main objective of the invention is to provide an improved gear shiftlever for an automobile with a manual transmission. The lock is mounted directly on the gear shift housing and shaft without much modification or alternation to the original gear shiftlever. Furthermore, once the lock is in a locked state, the gear shiftlever is no longer able to be moved to shift gears.

Another objective of the invention is to provide an annular ring mounted on the gear shift seat with a through hole defined therethrough. When the lock is in a locked state, a protrusion of a latch tube that surrounds the gear shiftlever is securely received in the through hole of the ring. Thus, the gear shiftlever is locked and will not be able to be moved.

Other objectives, advantages and novel features of the invention will become more apparent from the following detailed description when taken in conjunction with the accompanying drawings.

DETAILED DESCRIPTION OF PREFERRED EMBODIMENT

Figure 1:
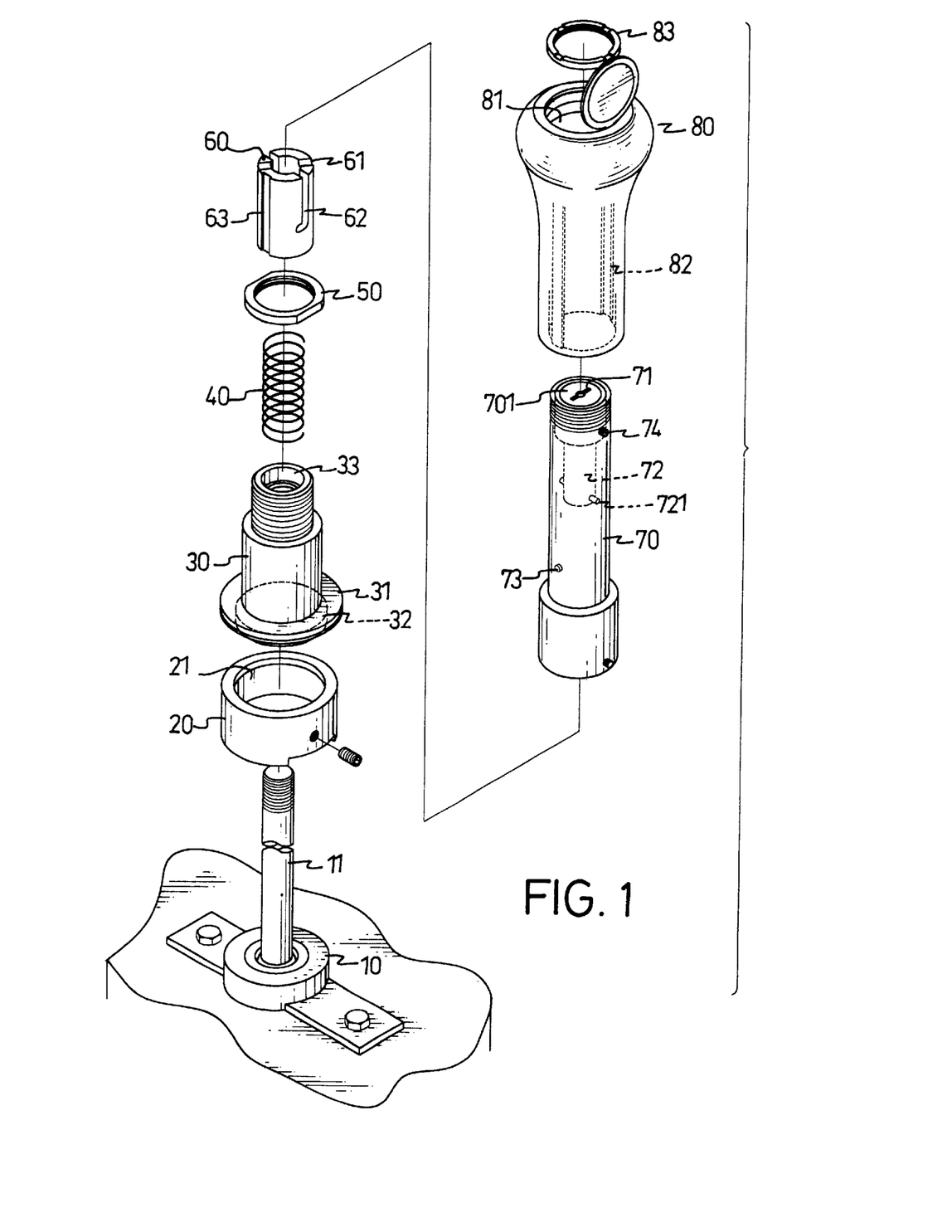
FIG. 1 is an exploded perspective view of the gear shiftlever lock in accordance with the present invention.

With reference to FIG. 1, the manual transmission gear shiftlever lock in accordance with the present invention comprises a gear shiftlever (11), a strike plate device, a latch assembly and a locking mechanism. The latch assembly mounted around the gear shiftlever (11) connects with the strike plate device to immobilize the gear shiftlever (11). The locking mechanism provides the means to engage or disengage the latch assembly from the strike plate device. Referring to FIG. 1, a gear shiftlever lock in accordance with the present invention comprises a substantially circular gear shiftlever seat (10) for securely receiving the gear shiftlever (11) to extend out therefrom, a strike plate ring (20) attached to the top of the seat (10) and having a through hole (21) defined therethrough, a tube (30) with a flange (31) detachably engaged with the periphery defining the through hole (21) of the strike plate ring (20), a protrusion (32) alternatively received in the through hole (21) and a shoulder (33) formed inside the tube (30), a spring (40) one end which compressibly abuts the face of the shoulder (33), an adjustment ring (50) screwed onto the top portion of the latch tube (30), a retaining tube (60) screwed onto the end of the gear shiftlever (11), abutted by the other end of the spring (40) and having a pair of notches (61) diametrically defined in the top face and a pair of diametrically defined L shaped slots (62) each separated from one of the notches (61) by 45°. Furthermore, the retaining tube (60) has a keyway (63) defined in the outer periphery thereof. The lock further comprises a hollow core (70) screwed onto the threaded end of the latch tube (30) with the spring (40) and the retaining tube (60) movably received therein. The core (70) has a keyhole (71) defined in a face (701) formed to close one end of the core (70), an extension (72) integrally extending down from the face (701) with a pair of studs (721) diametrically protruding out therefrom, a pin (73) extending into the inside of the core (70) and corresponding to the keyway (63) of the retaining tube (60) and a pair of opposite bosses (74) symmetrically protruding out from the outer periphery thereof. The extension (72) together with the face (701) is rotatable with respect to the core (70). A handle (80) has a path (81) defined therethrough and a pair of diametrically symmetrical grooves (82) defined in the face defining the path (81) corresponding to the pair of bosses (74).

Figure 2:
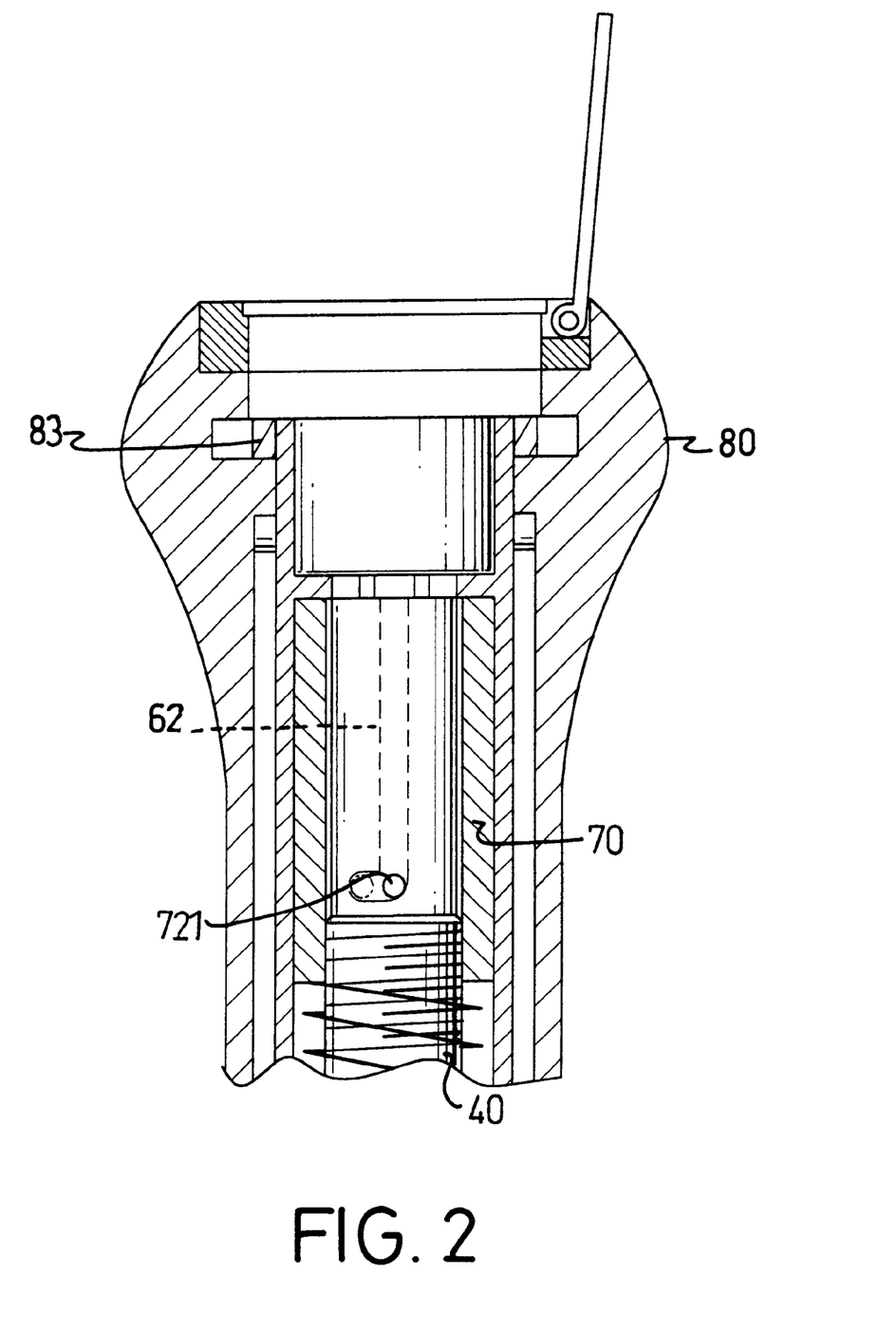
FIG. 2 is a side plan view in partial section of the relationship between the retaining tube and the core of the lock in FIG. 1.
Figure 3:
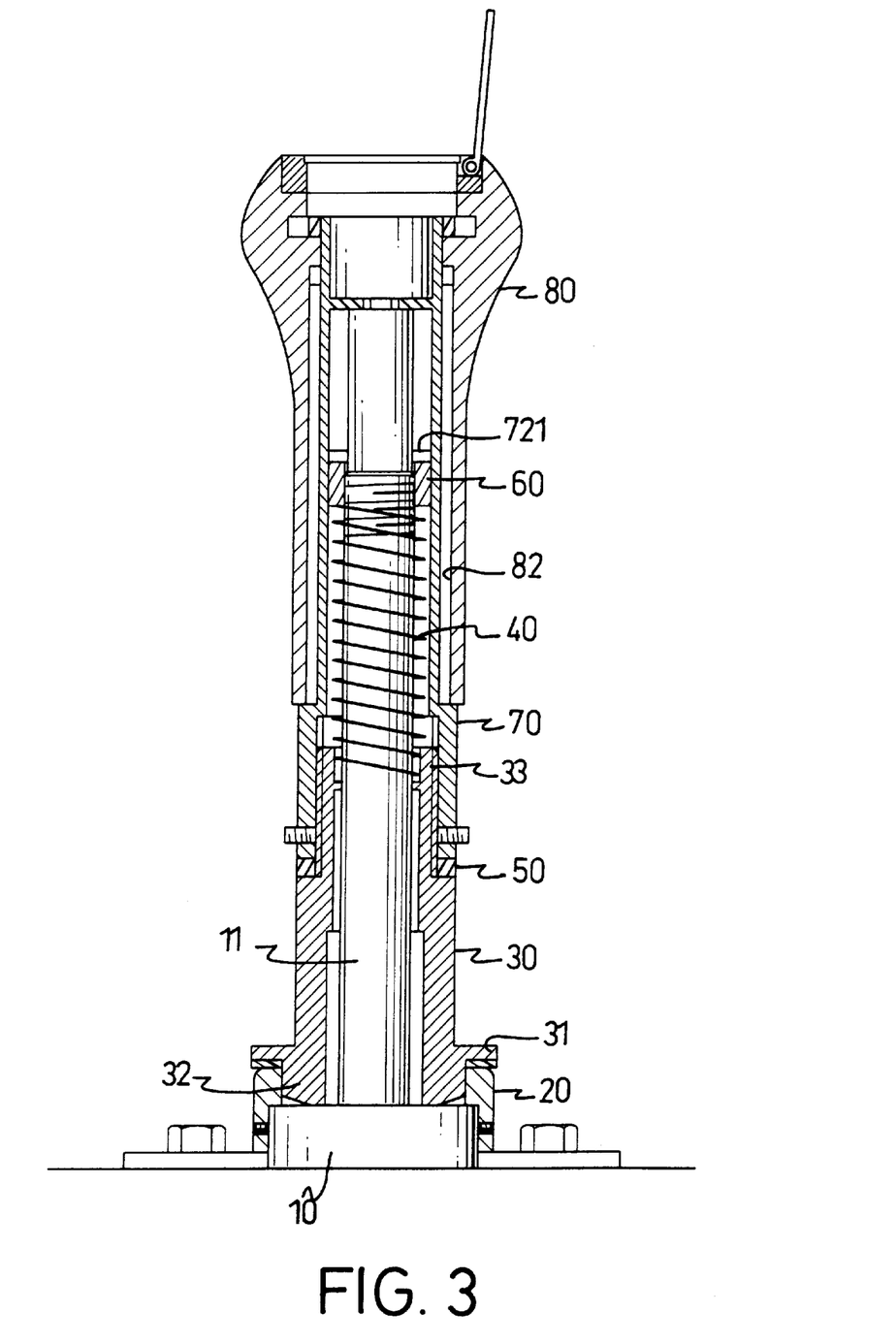
FIG. 3 is a side plan view in partial section of the gear shiftlever lock in FIG. 1, wherein an annular ring is still engaged with a gear shiftlever seat.
Figure 4:
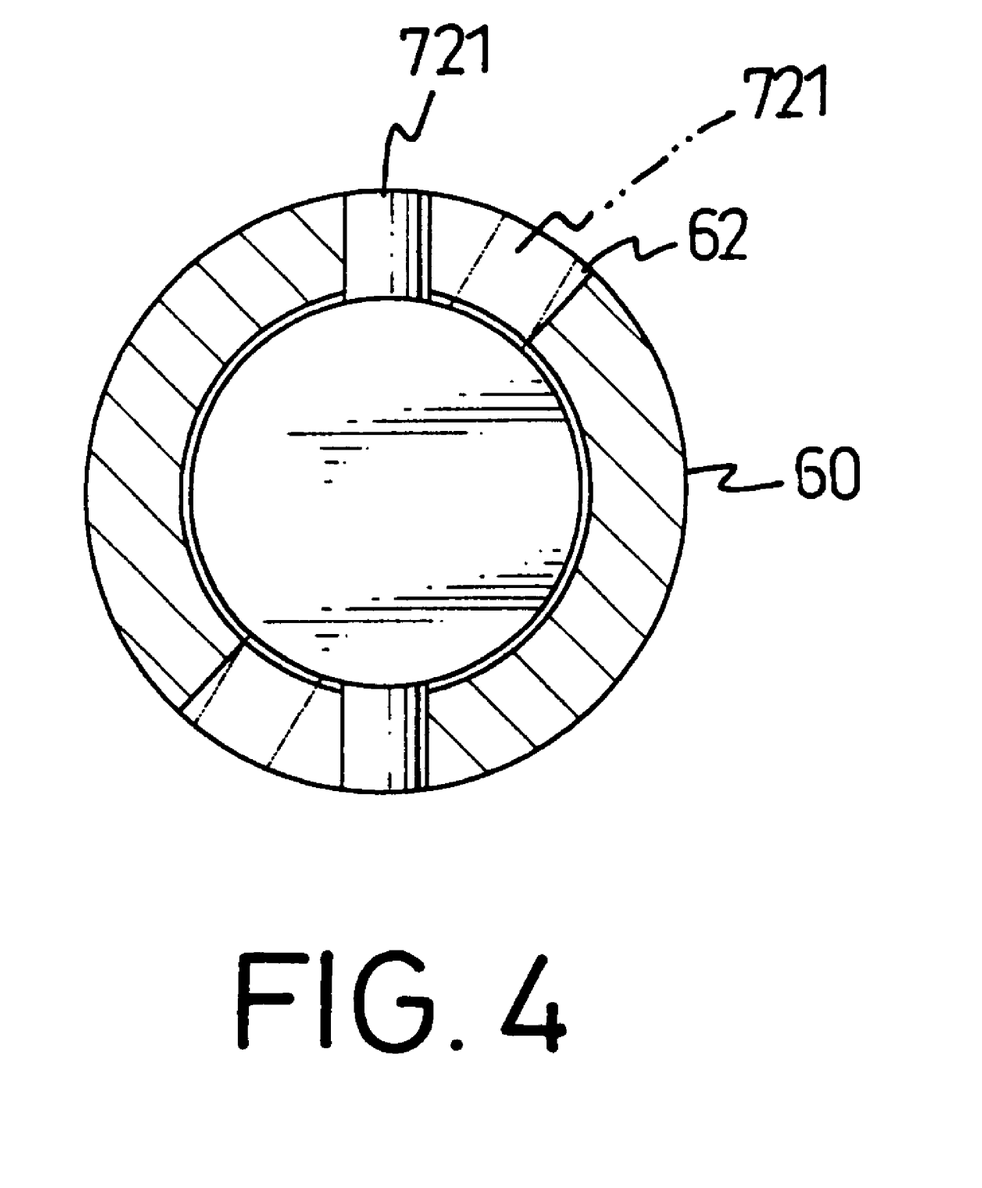
FIG. 4 is a top cross sectional view of the gear shiftlever lock in FIG. 1 showing the result of the rotation of the core relative to the retaining tube.
Figure 5:
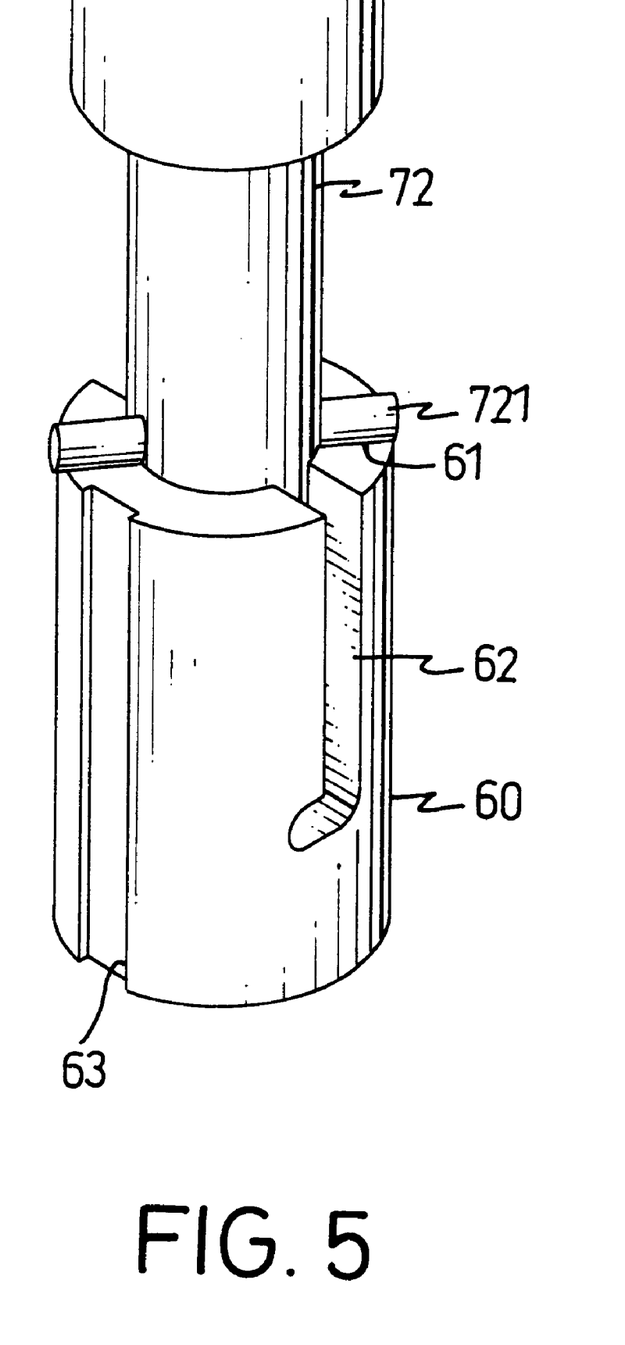
FIG. 5 is an enlarged perspective view of the gear shiftlever lock in FIG. 1 showing that the protruding studs of the core are rested on top of the retaining tube.
Figure 6:
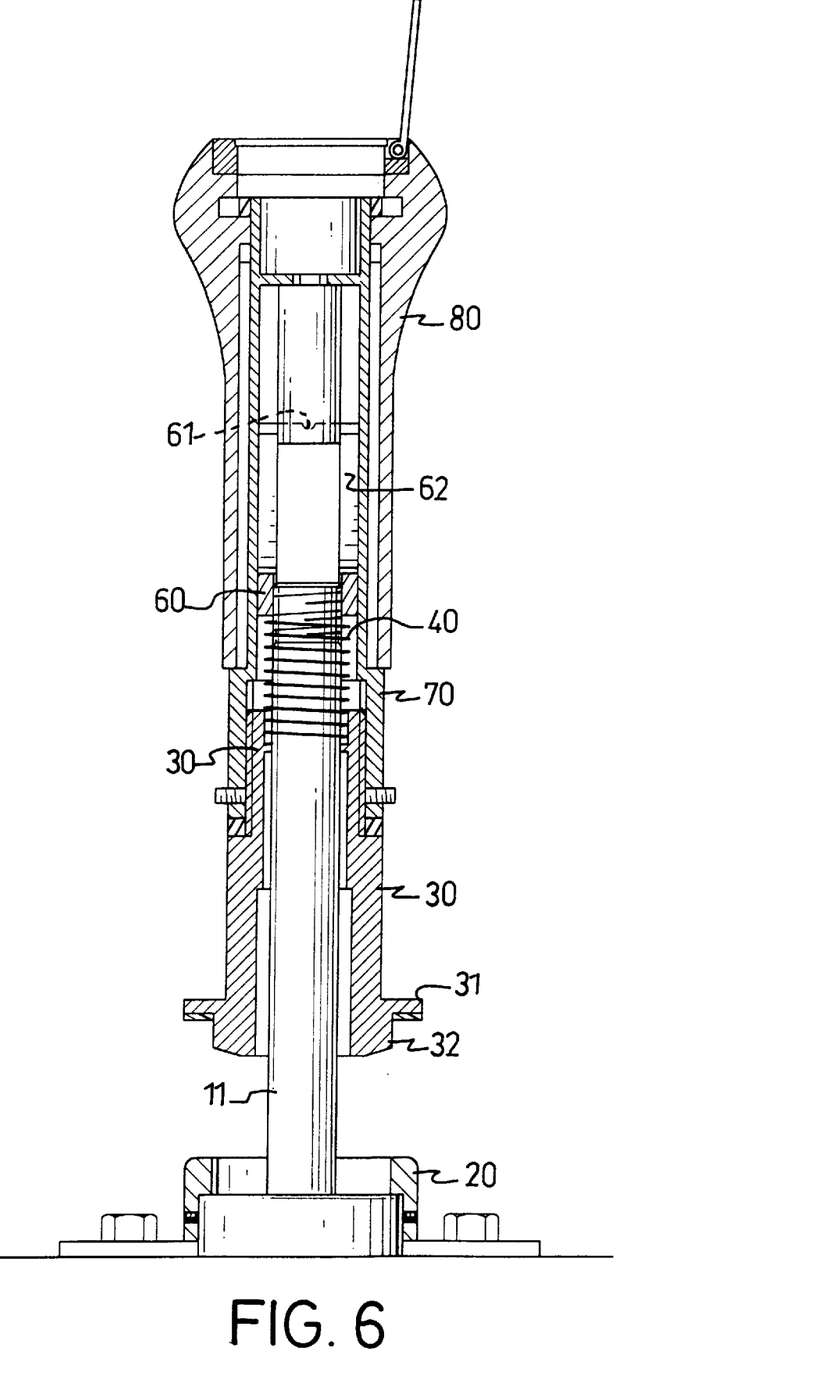
FIG. 6 is side plan view in partial section of the gear shiftlever lock in FIG. 1, wherein the annular ring is disengaged from the annular ring attached to the gear shiftlever seat.

Referring to FIGS. 2 and 3 and still taking FIG. 1 for reference, when the gear shiftlever lock in accordance with the present invention is assembled, the core (70) is inserted into the path (81) of the handle (80) and secured therein by a securing ring (83) threadingly engaged with the inner periphery defining the path (81). When the core (70) is inserted into the path (81), the pair of symmetrical bosses (74) are slid along the pair of grooves (82), such that the grooves (82) limit the rotational movement of the core (70) and allow movement upward or downward relative to the longitudinal axis of the handle (80). Then, the retaining tube (60) is inserted into the core (70) with the pin (73) of the core (70) staying in the keyway (63). Accordingly, the rotational movement of the retaining tube (60) is limited, and movement is allowed in only an upward or downward direction relative to the core (70). After the retaining tube (60) is inserted into the core (70), the pair of studs (721) rest in the bottom of the L shaped slot (62). Thus, rotation of the keyhole (71) by a proper key (not shown) will lead the rotation of the extension (72), such that the pair of studs (721) each will stay in the respective distal ends of the L shaped slots (62) and the retaining tube (60) is therefore retained within the core (70), as shown in FIG. 4. Since the diameter of the spring (40) is the same as that of the free end of the retaining tube (60), one end of the spring (40) will abut the free end of the retaining tube (60). The adjustment ring (50) is threadingly engaged with the top portion of the latch tube (30) to an extent that while the other end of the spring (40) rests in the shoulder (33) of the latch tube (30), the spring (40) is snugly received between the shoulder (33) and the free end of the retaining tube (60). The top portion of the latch tube (30) is then threadingly engaged with the inner face of the bottom of the core (70) so as that the spring (40) and the retaining tube (60) are securely retained within the core (70). Thereafter, the strike plate ring (20) is securely mounted on the seat (10) by any appropriate known method, while the gear shiftlever (11) extends out from the circular seat (10), through the through hole (21), the tube (30), the spring (40) and threadingly engages with an inner periphery of a bottom of the retaining tube (60). When assembly of the lock of the invention is finished, rotating the keyhole (71) once again is able to set the retaining tube (60) free from the limit of the studs (721) of the extension (72). Meanwhile, after the limit to the retaining tube (60) vanishes, pushing downward the retaining tube (60) will cause the pair of studs (721) to slide within the slot (62). When the pair of studs (721) slide to the end of the slot (62), rotation of the keyhole (71) again will allow the studs (721) to stay in the pair of notches (61) of the retaining tube (60), as shown in FIG. 5.

Furthermore, when the gear shiftlever lock of the invention is in the locked state, which is that the gear shiftlever (11) is not able to proceed the operation of gear shift, it is noted that the protrusion (32) of the latch tube (30) is received in the through hole (21) of the strike plate ring (20) and the flange (31) engages the top periphery defining the through hole (21), as shown in FIG. 3.

When the gear shiftlever lock is in use, a user first rotates the keyhole (71) to allow the studs (721) which are originally located on the respective notches (61) of the retaining tube (60) to align with the slots (62) of the retaining tube (60). After the studs (721) align with the slot (62), the user pushes down the handle (80), because the handle (80) and the core (70) are securely engaged with each other, the core (70) will also move downward relative to the circular seat (10). Thus, the pair of studs (721) will travel along the respective slots (62) until reach the bottom of the slots (62). Meanwhile, continuous rotation of the keyhole (71) will drive the pair of studs (721) to the distal ends of the slots (62) and the studs (721) are thus retained in the slots (62). However, it is noted that when the handle (80) is pushed downward, the latch tube (30) is pushed downward as well. Therefore, when the studs (721) are secured within the distal ends of the slots (62), the protrusion (32) of the latch tube (30) is received in the through hole (21) of the strike plate ring (20). Thus, the gear shiftlever lock accordance with the present invention is in a locked state.

To unlock the locked gear shiftlever (11), the user rotates the keyhole (71) to align the pair of studs (721) with the slots (62) again so as to free the studs (721) from the distal ends of the slots (62). Then, the user lifts the handle (80) together with the latch tube (30) to move the pair of studs (721) to the face defining the notches (61). Thereafter, the user rotates the keyhole (71) once again the rest the pair of studs (721) on the respective notches (61) so as to enable the gear shiftlever (11) to move freely. That is, the gear shiftlever lock of the present invention is a unlocked state.

Figure 7:
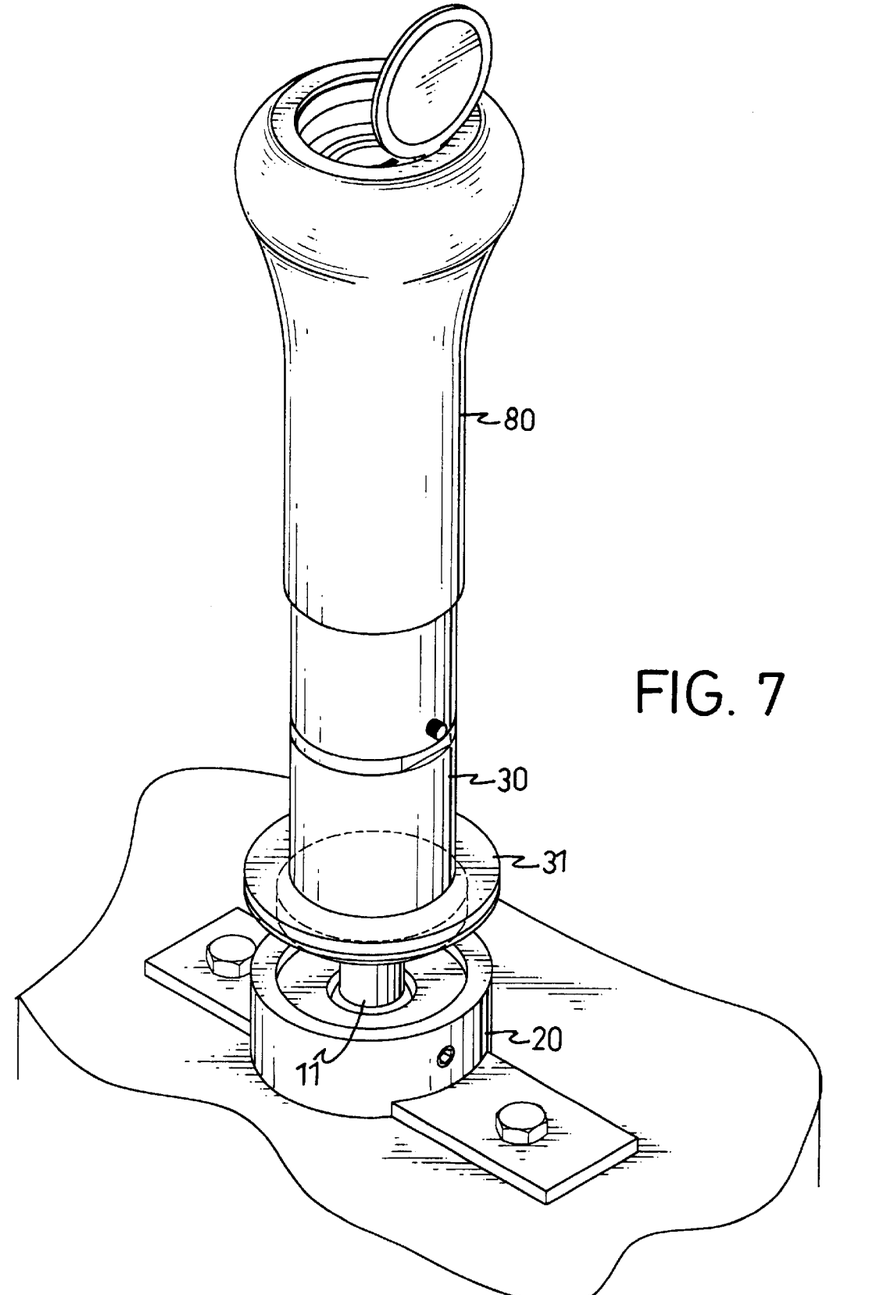
FIG. 7 is a perspective view of the gear shiftlever lock in FIG. 1 in an unlocked state.

FIG. 7 shows a perspective view of the gear shiftlever lock in use, wherein the latch tube (30) is away from the strike plate ring (20), such that the gear shiftlever (11) is able to shift to any gear desired.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A gear shift lock for a gear shiftlever of an automobile with a manual transmission, the gear shift lock comprising:

a gear shiftlever seat (10) for securely receiving the gear shiftlever (11) therein so as to allow the gear shiftlever (11) to extend out therefrom;

a strike plate ring (20) firmly mounted on top of the seat (10) and having a through hole (21) defined therethrough;

a latch tube (30) with a flange (31) detachably engaged with a periphery defining the through hole (21) of the ring (20), a protrusion (32) formed beneath the flange (31) to be alternatively received in the through hole (21) and a shoulder (33) formed inside the tube (30);

a spring (40) a first end of which is compressibly abutted to the shoulder (33) so as to alternatively push the tube (30);

an adjustment ring (50) threadingly engaged with a top portion of the rube (30);

a retaining tube (60) securely connected with a free end of the gear shiftlever (11) by inserting through the strike plate ring (20), the tube (30), the spring (40) and the adjustment ring (50) and abutted by a second end of the spring (40); wherein the retaining tube (60) has a pair of notches (61) diametrically defined in a top face thereof, a pair of diametrically defined L shaped slots (62) each being apart from either one of the notches (61) and a keyway (63) defined in an outer periphery thereof;

a hollow core (70) securely engaged with the tube (30) and having the spring (40) and the retaining tube (60) movably received therein and having a keyhole (71) rotatably defined in a face (701) formed to close one end of the core (70), an extension (72) integrally rotatable with the keyhole (71) and having a pair of studs (721) diametrically protruding out therefrom to alternatively correspond between the pair of L shaped slots (62) and the notches (61), a pin (73) extending into the inside of the core (70) and corresponding to the keyway (63) of the retaining tube (60) and a pair of opposite bosses (74) symmetrically protruding out from the outer periphery thereof;

a handle (80) having a path (81) defined to receive the core (70) therein and a pair of symmetrically defined tracks (82) in a face defining the path (81) to correspond to the pair of bosses (74);

wherein the rotation of the keyhole (71) together with the extension (72) will allow the studs (721) to alternatively align between the notch (61) and the L shaped slots (62) and a lift movement of the handle (80) will move the studs (721) to the bottom of the L shaped slots (62) and the protrusion away from the through hole (21) of the strike plate ring (20) thereby allowing free movement of the gear shiftlever (11);

wherein the rotation of the keyhole (71) will alternatively drive the studs (721) to be retained/free by the L shaped slots (62).

2. The lock as claimed in claim 1, wherein the adjustment ring is so connected with the top portion of the tube (30) that when the lock is in an unlock state, the spring (40) snugly abuts between the retaining tube (60) and the latch tube (30).

* * * * *